US006978973B1

(12) United States Patent
Gretz

(10) Patent No.: US 6,978,973 B1
(45) Date of Patent: Dec. 27, 2005

(54) PIPE OR CABLE CLAMP

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 11/028,713

(22) Filed: Jan. 4, 2005

(51) Int. Cl.$^7$ ............................................. F16L 3/12
(52) U.S. Cl. ................................... 248/74.1; 248/74.3
(58) Field of Search .............................. 248/74.1, 74.2, 248/74.3, 62, 68.1, 316.5, 316.7, 231.61, 248/230.1, 230.7; 24/16 PB, 16 R

(56) References Cited

U.S. PATENT DOCUMENTS

| | | | |
|---|---|---|---|
| 3,913,187 A | 10/1975 | Okuda | |
| 4,291,855 A | 9/1981 | Schenkel et al. | |
| 4,527,760 A * | 7/1985 | Salacuse | 248/108 |
| 4,624,432 A * | 11/1986 | Salacuse | 248/316.5 |
| 4,802,646 A * | 2/1989 | Cattani | 248/316.5 |
| 4,955,574 A | 9/1990 | Freier | |
| 5,094,578 A * | 3/1992 | Light et al. | 411/104 |
| 5,118,215 A | 6/1992 | Freier | |
| 5,277,387 A * | 1/1994 | Lewis et al. | 248/74.2 |
| 5,572,776 A * | 11/1996 | Murphy et al. | 24/543 |
| 5,697,585 A * | 12/1997 | Hungerford, Jr. | 248/74.3 |
| 5,794,896 A | 8/1998 | Hungerford, Jr. | |
| 6,164,605 A * | 12/2000 | Drake et al. | 248/74.3 |
| 6,460,813 B1 * | 10/2002 | Gretz | 248/62 |

* cited by examiner

Primary Examiner—Anita King
Assistant Examiner—Tan Le

(57) ABSTRACT

A pipe or cable clamp having a base portion, flexible legs, and an arcuate arm connected to each of the legs. The arcuate arms include inner and outer arcuate surfaces with the inner arcuate surfaces defining a substantially circular opening. The clamp includes a closure arrangement for closing the arcuate arms and a locking arrangement for securing the arms in the closed position. The clamp is especially useful for securing pipes or cables to a vertical surface. Arm supports extending from the base portion cooperate with posts extending outwardly from the arcuate arms to buttress and support the arcuate arms. The arm supports also brace the flexible leg on the upper side of the vertically-mounted clamp to provide further support and bracing for the arcuate arms.

12 Claims, 6 Drawing Sheets

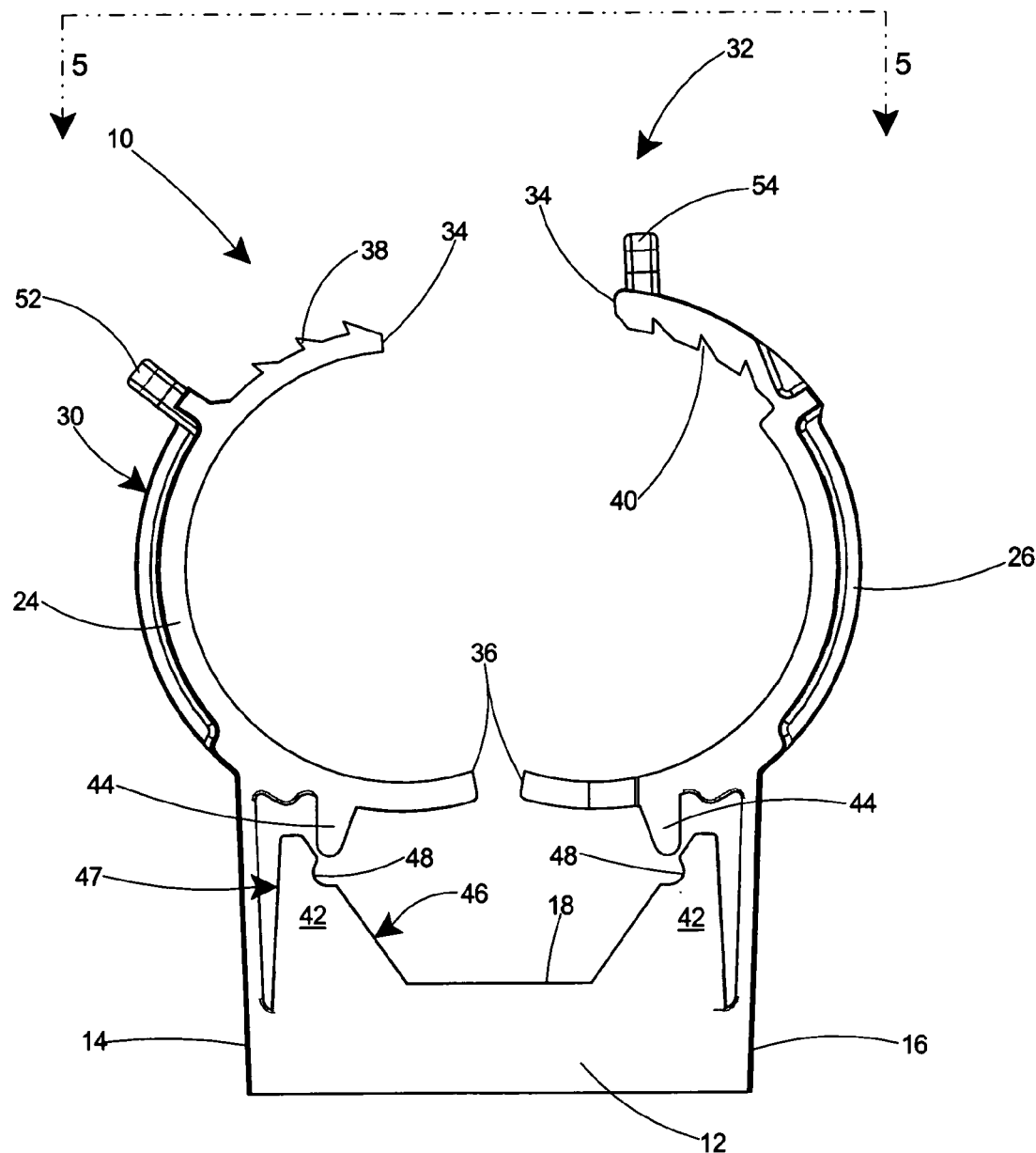

PIPE OR CABLE CLAMP

FIELD OF THE INVENTION

This invention relates to supports for tubular objects and specifically to an improved clamp for supporting a pipe or a bundle of cables.

BACKGROUND OF THE INVENTION

It is common to use clamps for anchoring pipes to horizontal, vertical, or other surfaces in buildings, manufacturing plants, and other facilities.

U.S. Pat. No. 5,118,215 (hereinafter the '215 patent) discloses a pipe clip having flexible struts extending from a base portion. Strap segments extending from the struts include parallel closure tongues for enclosing and holding a pipe therein. In order to provide protection against excessive forces acting on an inserted pipe, hooks are provided on a lower end of each strap segment. The hooks interact with stop bosses on a base plate to protect the lower end portions and struts against overelongation.

Although the pipe clip of the '215 patent provides an adequate device for supporting a pipe on a horizontal surface, some deficiencies become apparent when the clip is mounted to a vertical surface. A first disadvantage is that, for a vertical mounting, the protection against overelongation of the struts relies upon one point of contact between a hook and a corresponding stop boss. With the clip anchored to a wall and supporting a pipe running horizontally across the wall, a hook on the downward side of the pipe clip engages a stop boss on the base plate. However, this is the only point of reinforcement for the struts as the hook on the opposite lower strap segment is not engaged with the opposite stop boss.

A second disadvantage of the pipe clip shown in the '215 patent involves the integrity of the clip as a pipe is supported therein. Particularly in a vertical installation as described above, the integrity of the clip remaining closed relies upon the frictional hold of the teeth on the parallel closure tongues. It should be apparent that, in the case of impacts upon the clip, the closure tongues could be forced apart, thereby causing the strap segments to open and causing the inserted pipe to fall out. This is a serious problem as some pipes are quite heavy, being constructed of iron or steel, and when full of liquids typically exert a tremendous amount of force on the strap segments and connecting struts.

Therefore, what is needed is a pipe support that overcomes the deficiencies of the prior art, including improved protection against overelongation of the various portions of the support and an improved arrangement for keeping the support closed around the inserted pipe.

SUMMARY OF THE INVENTION

The invention is a pipe clamp having a base portion, flexible legs, and an arcuate arm connected to each of the legs. The arcuate arms include inner and outer arcuate surfaces with the inner arcuate surfaces defining a substantially circular pipe-receiving opening. The pipe clamp includes a closure arrangement for closing the arcuate arms and a locking arrangement for securing the arms in the closed position. The clamp is especially useful for securing pipes to a vertical surface. Arm supports extending from the base portion cooperate with posts extending outwardly from the arcuate arms to buttress and support the arcuate arms. The arm supports also brace the flexible leg on the upper side of the vertically mounted clamp to provide further support and bracing for the arcuate arms.

DESCRIPTION OF THE DRAWINGS

FIG. 4 is a rear elevation view of the pipe clamp of FIG. 1 with the clamp open.

Figure 1:
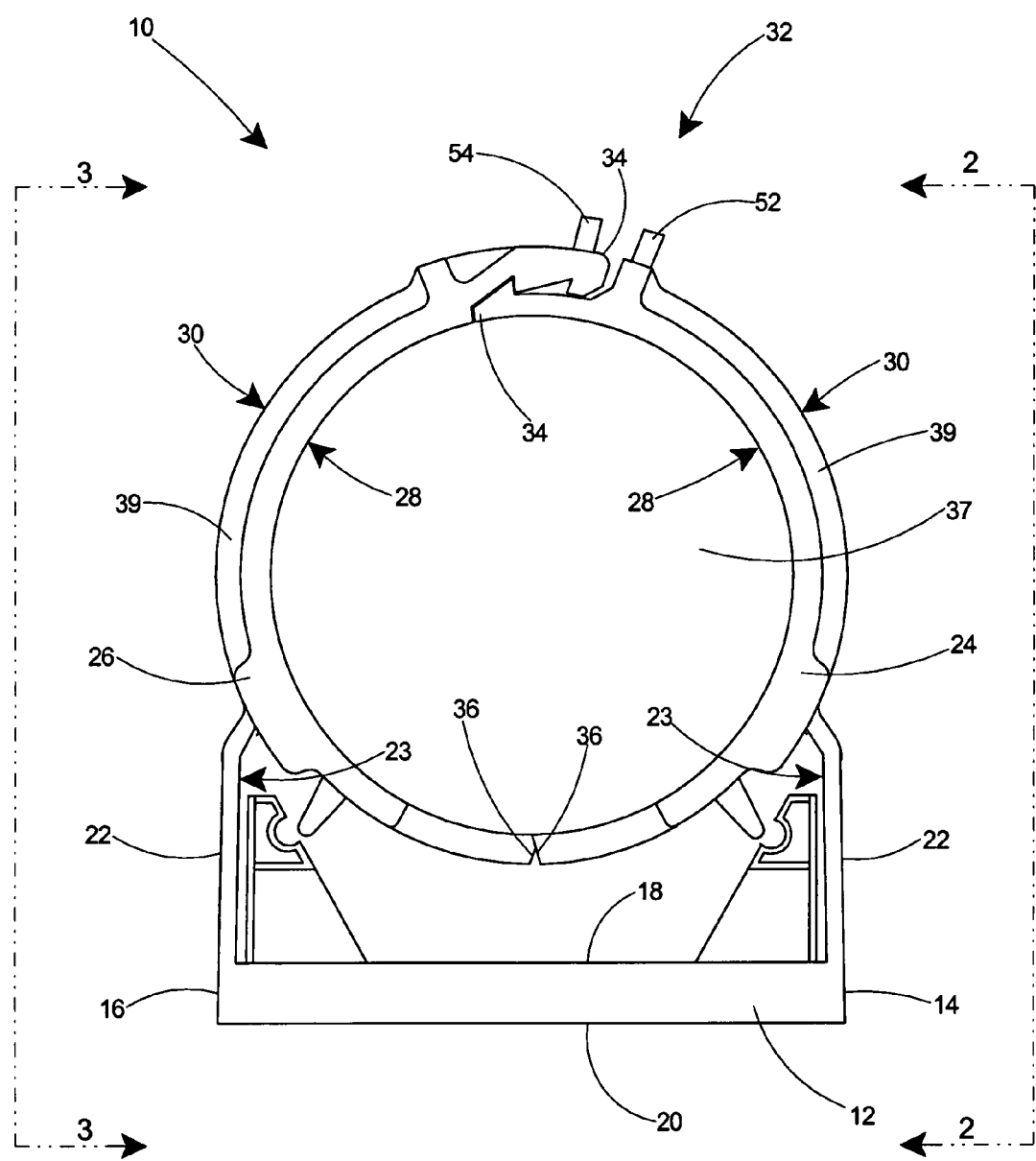
FIG. 1 is a front elevation view of a preferred embodiment of the pipe clamp of the present invention with the clamp closed.
Figure 3:
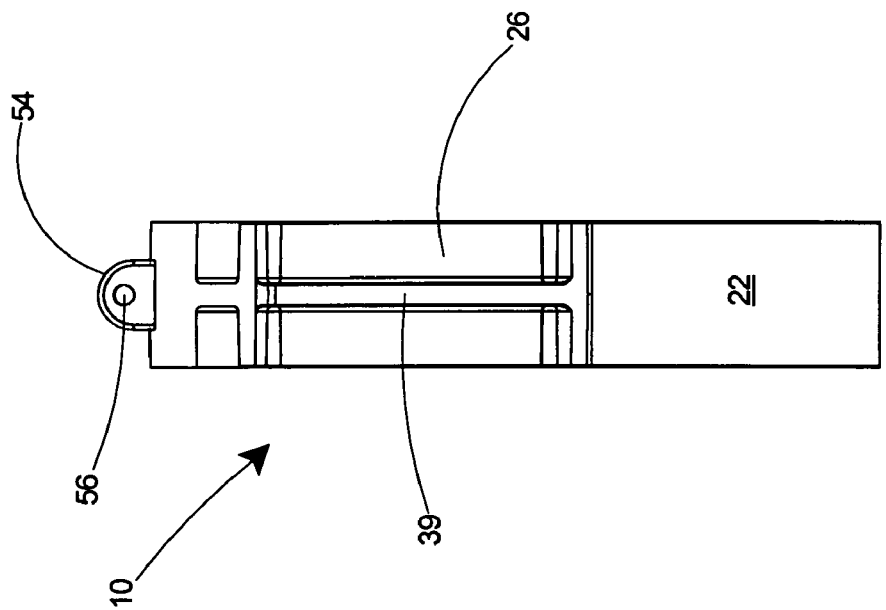
FIG. 3 is a side view of the pipe clamp taken along line 3—3 of FIG. 1.

| Index to Reference Numerals in Drawings | |
|---|---|
| 10 | pipe clamp |
| 12 | base portion |
| 14 | end of base portion |
| 16 | end of base portion |
| 18 | top side of base portion |
| 20 | bottom side of base portion |
| 22 | flexible leg |
| 23 | inner surface of flexible leg |
| 24 | first arcuate arm |
| 26 | second arcuate arm |
| 28 | inner arcuate surface |
| 30 | outer arcuate surface |
| 32 | closure arrangement |
| 34 | upper end of arcuate arm |
| 36 | lower end of arcuate arm |
| 37 | pipe-receiving opening |
| 38 | teeth |
| 39 | peripheral ribs |
| 40 | triangular notch |
| 42 | arm support |
| 44 | post |
| 46 | inner surface of arm support |
| 47 | outer surface of arm support |
| 48 | post-receiving notch |
| 50 | locking arrangement |
| 52 | first locking tab |
| 54 | second locking tab |
| 56 | aperture in locking tab |
| 58 | fastener in locking arrangement |
| 60 | anchoring arrangement |
| 62 | aperture in base portion |
| 64 | fastener in anchoring arrangement |
| 66 | vertical surface |
| 68 | pipe |

DETAILED DESCRIPTION OF THE INVENTION

With reference to FIG. 1 there is shown a preferred embodiment of a pipe clamp 10 according to the present invention. The pipe clamp 10 includes an elongated base portion 12 having two ends 14 and 16. The elongated base portion 12 includes a top side 18 and a bottom side 20. A flexible leg 22 having an inner surface 23 extends from each of the ends 14, 16. An arcuate arm is connected to each of the flexible legs 22, including a first arcuate arm 24 and second arcuate arm 26. The arcuate arms 24, 26 include inner 28 and outer 30 arcuate surfaces, with the inner arcuate surfaces 28 of the arcuate arms facing one another. The clamp 10 includes a closure arrangement 32 on the arcuate arms 24, 26. The arcuate arms 24, 26 include an upper 34 and a lower 36 end with the flexible legs 22 connected at a position intermediate the upper 34 and lower ends 36. The inner arcuate surfaces 28 of the arcuate arms 24, 26 define a substantially circular pipe-receiving opening 37. Peripheral ribs 39 extend from the outer arcuate surface 30 of both arcuate arms 24, 26 from the connection point with the flexible legs 22 to the vicinity of the closure arrangement 32. The peripheral ribs 39 strengthen the arcuate arms 24, 26 without adding appreciably to the manufacturing cost of the pipe clamp 10 as the peripheral ribs 39 do not extend laterally across the entire width of the arcuate arms 24, 26.

Referring to FIG. 4, the pipe clamp 10 is shown in an open configuration with the arcuate arms 24, 26 spread apart. The closure arrangement 32 includes one or more teeth 38 on the outer arcuate surface 30 of the first arcuate arm 24 near the upper end 34 and a plurality of triangular notches 40 on the inner arcuate surface 28 the second arcuate arm 26 proximate the upper end 34. The pipe clamp 10 further includes arm supports 42 extending upward from the top side 18 of the base portion 12 and posts 44 extending outwardly from the arcuate arms 24, 26 toward the arm supports 42. The triangular shaped arm supports 42 further include an inner surface 46, an outer surface 47, and post-receiving notches 48 along their inner surfaces 46. The post-receiving notches 48 are preferably substantially semicircular in shape and are adjacent and in close proximity to the corresponding posts 44 on that side.

Figure 2:
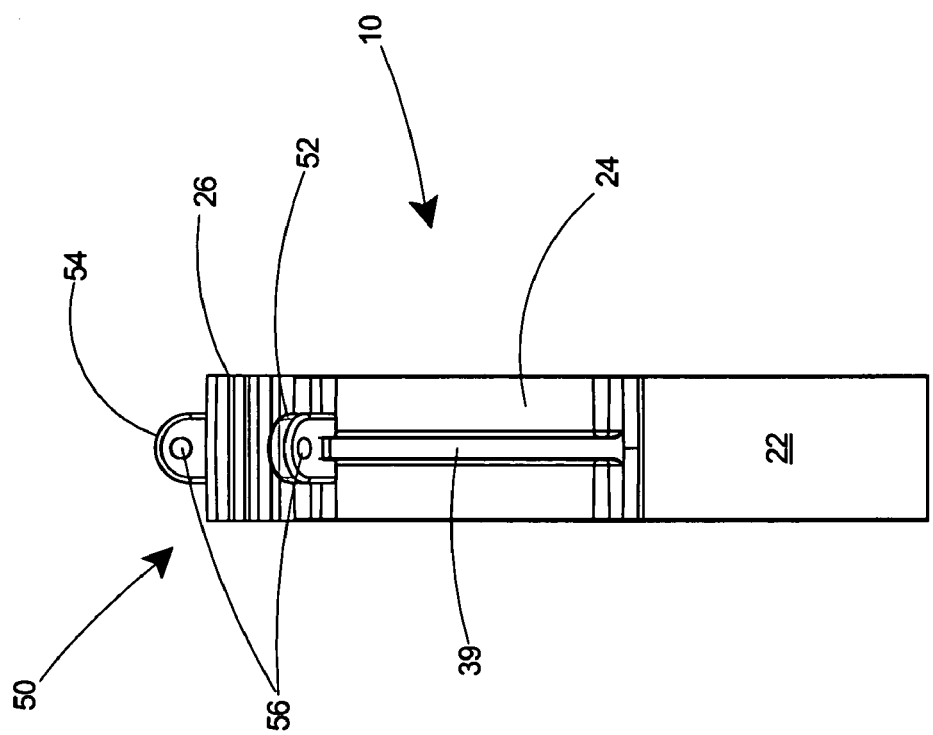
FIG. 2 is a side view of the pipe clamp taken along line 2—2 of FIG. 1.
Figure 8:
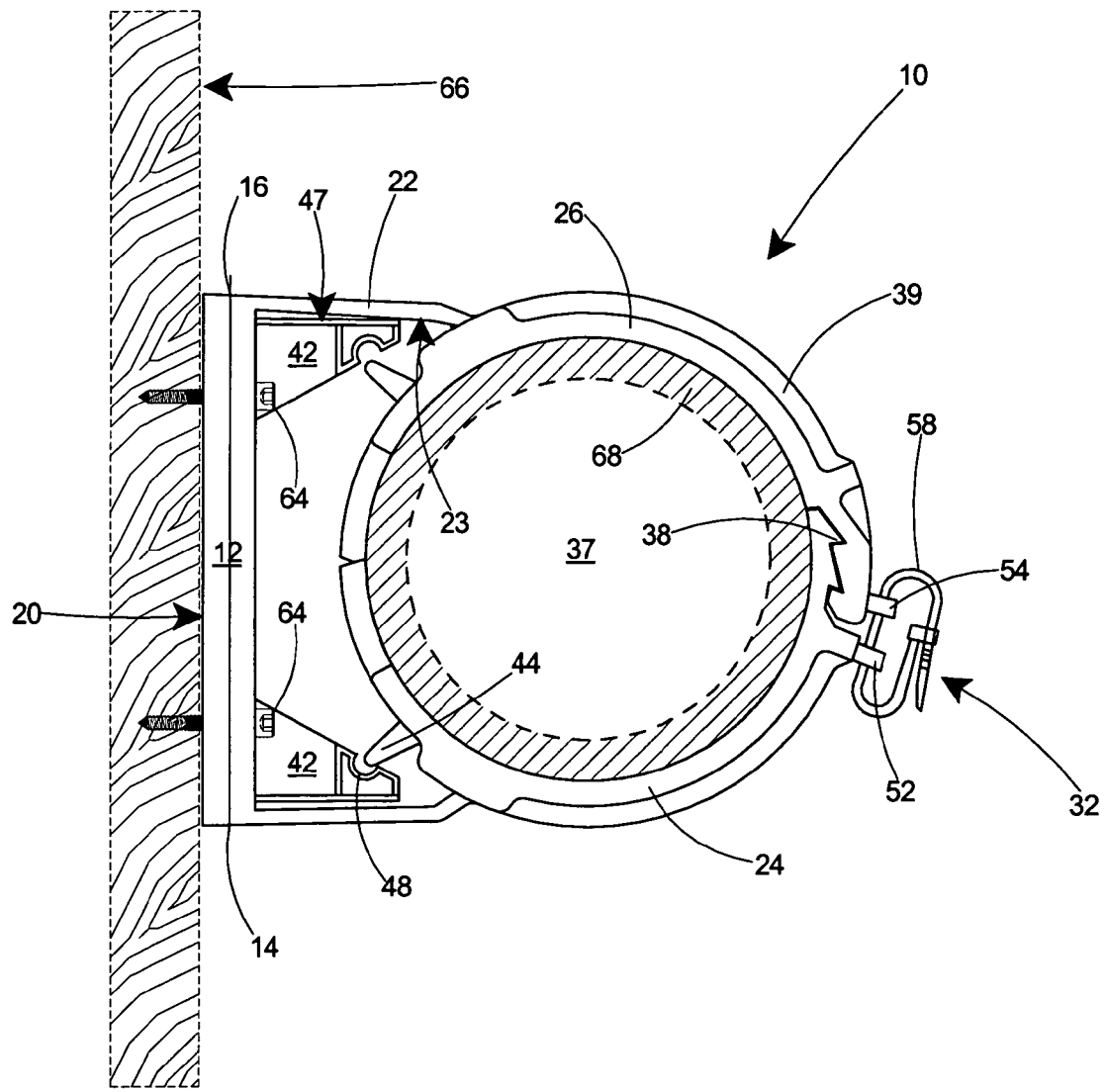
FIG. 8 is a side view of the clamp of FIG. 1 mounted to a vertical surface and having a pipe inserted therein.

With reference to FIG. 2, the pipe clamp 10 includes a locking arrangement 50 on the arcuate arms 24, 26. The locking arrangement 50 includes a first locking tab 52 extending from the outer arcuate surface 30 of the first arcuate arm 24, a second locking tab 54 extending from the outer arcuate surface 30 of the second arcuate arm 26, and an aperture 56 in each of the locking tabs 52, 54. As shown in FIG. 8, a fastener 58, such as a cable tie, can be disposed through the apertures 56 in the locking tabs 52, 54 and the ends secured together to secure the arcuate arms 24, 26 in the closed position.

Figure 5:
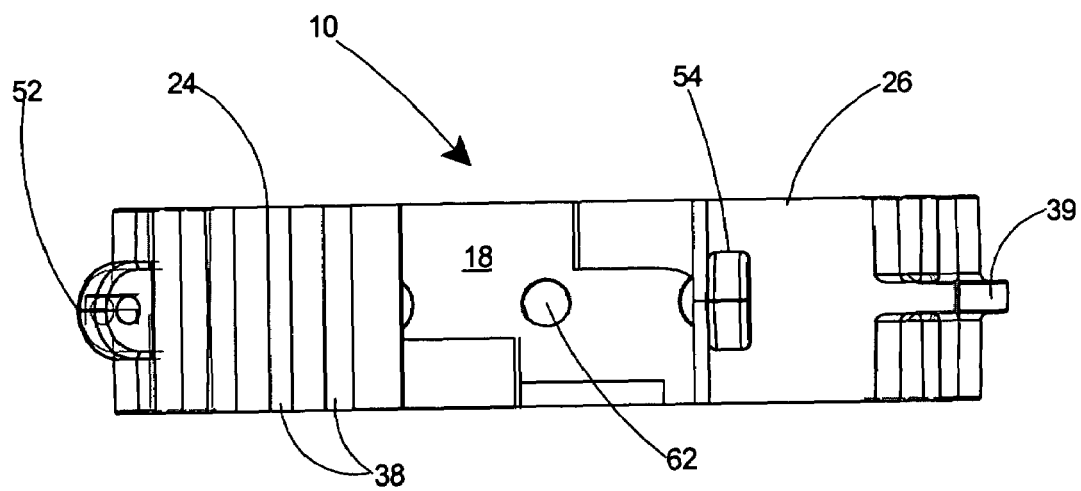
FIG. 5 is a top view of the pipe clamp taken along line 5—5 of FIG. 4.
Figure 6:
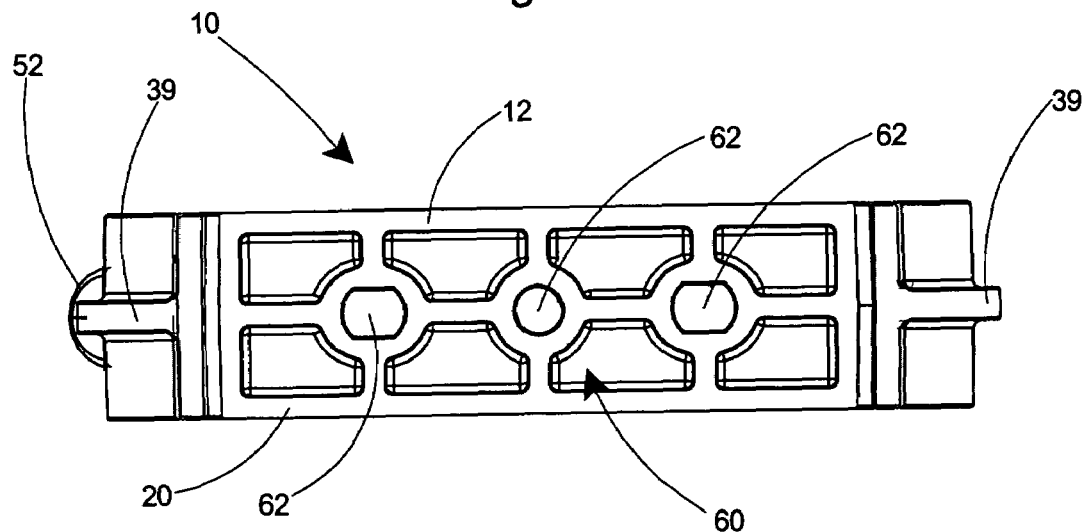
FIG. 6 is a bottom view of the pipe clamp taken along line 6—6 of FIG. 4.
Figure 7:
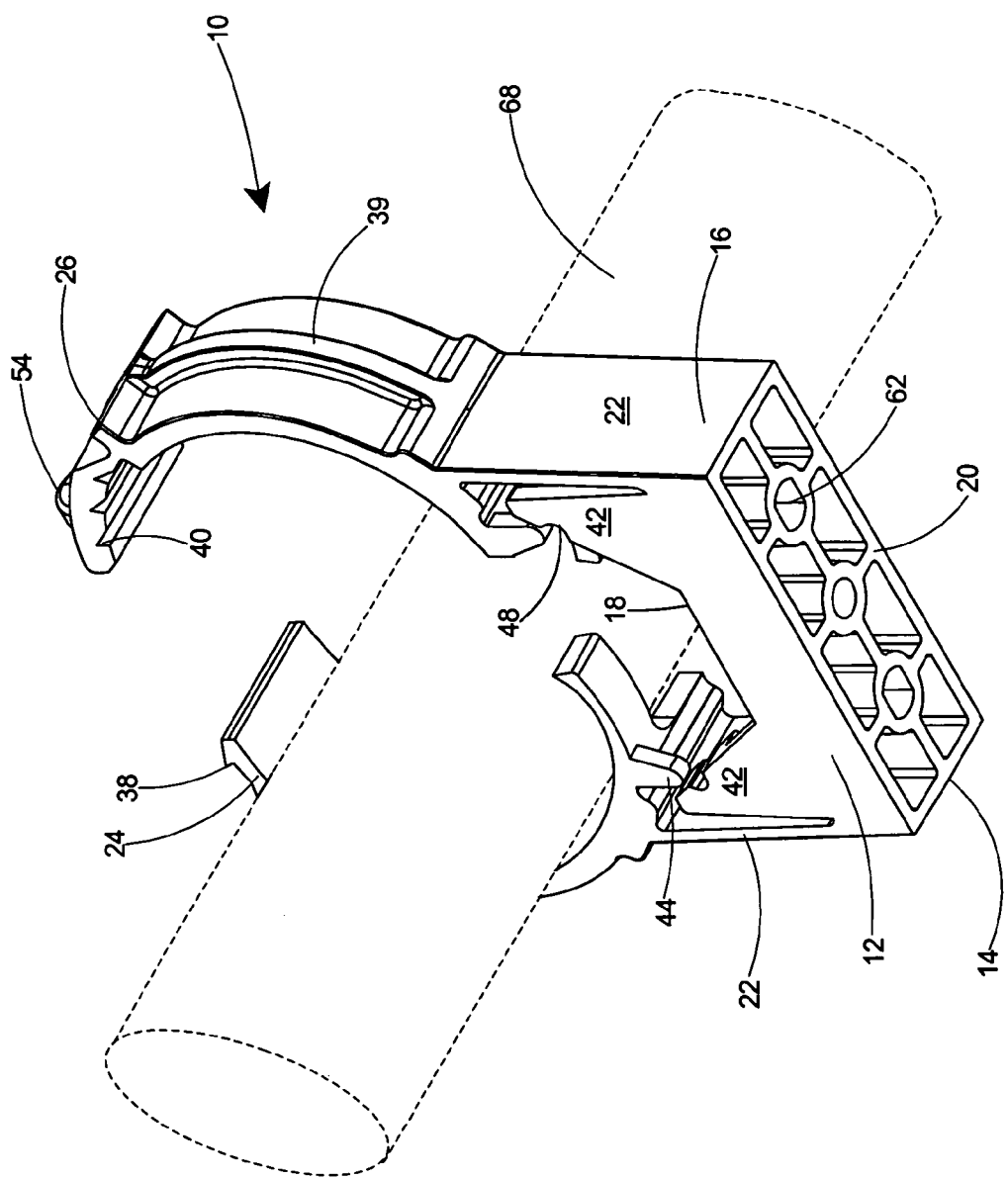
FIG. 7 is a perspective view of the pipe clamp of FIG. 1 in an open configuration and with a pipe inserted within the pipe-receiving opening of the clamp.

Referring to the top and bottom views of the pipe clamp 10 in FIGS. 5 and 6, an anchoring arrangement 60 is included on the base portion 12. The anchoring arrangement 60 includes one or more apertures 62 extending from the top side 18 to the bottom side 20 of the base portion 12. A fastener 64, such as that shown in FIG. 8, can be extended through one or more of the apertures 62 in the base portion 12 to anchor the pipe clamp 10 to a surface 66.

In operation, the pipe clamp 10 of the present invention may be mounted on a surface in any angular orientation, including horizontal, vertical, or something in between. Mounting the bottom side 20 of the base portion 12 on a horizontal surface and insertion of a pipe within the pipe-receiving opening 37 urges the posts 44 toward the post-receiving notches 48.

The pipe clamp 10 of the present invention is especially useful when mounted to a vertical surface 66, as shown in FIG. 8. The base portion 12 of the pipe clamp 10 is first anchored to the vertical surface 66 by use of the anchoring arrangement 60. The anchoring arrangement 60 includes one or more fasteners 64. Anchoring the pipe clamp 10 to the vertical surface 66 with the bottom side 20 of the base portion 12 on the vertical surface 66 orients one of the posts 44 upward and one of the posts 44 downward. Insertion of a pipe 68 within the pipe-receiving opening 37 urges the downward oriented post 44 downward and into engagement with the post-receiving notch 48. The inner surfaces 23 of the flexible legs 22 are in close proximity to the outer surface 47 of the arm support 42. Mounting of the bottom side 20 of the base portion 12 on a vertical surface 66, such as shown in FIG. 8, and insertion of a pipe 68 within the pipe-receiving opening 37 urges the inner surface 23 of the uppermost flexible leg 22 against the outer surface 47 of the uppermost arm support 42. Therefore, when mounted to a vertical surface 66, the pipe clamp 10 provides extra support and bracing in two locations, with the lowermost post 44 extending into and braced against the post-receiving notch 48 of the lowermost arm support 42, and the uppermost flexible leg 22 extending against and braced against the uppermost arm support 42. As a result, the pipe clamp 10 of the present invention removes mechanical stress from the flexible legs 22 and places the stress from the weight of the inserted pipe 68 upon the arm supports 42, which are substantially thick and strong extensions from the thick base portion 12, and are capable of withstanding the loads and bending moments caused by the weight of the inserted pipe 68.

With reference to FIG. 8, the pipe clamp 10 shown herein provides a method of supporting a pipe that includes the steps of securing the base portion 12 to a surface 66 with the anchoring arrangement 60, inserting a pipe 68 within the pipe-receiving opening 37, closing the closure arrangement 32 of the pipe clamp 10, and locking the locking arrangement 50.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

What is claimed is:

1. A clamp comprising:
    an elongated base portion having two ends, a top side and a bottom side;
    a flexible leg extending from each of said ends;
    an arcuate arm connected to each of said legs, said arcuate arms including inner and outer arcuate surfaces, said inner arcuate surfaces of said arcuate arms facing one another;
    a closure arrangement on said arcuate arms;
    a locking arrangement on said arcuate arms;
    arm supports extending upward from said top side of said base portion;
    a post extending outwardly from said arcuate arms and toward said arm supports;
    an anchoring arrangement on said base portion; and
    locking tabs having apertures therein on said arcuate arms; and
    a fastener through said apertures in said locking tabs for securing said arcuate arms together.

2. The clamp of claim 1 including post-receiving notches in said arm supports.

3. The clamp of claim 2 wherein said post-receiving notches are semicircular in shape.

4. The clamp of claim 1 wherein said arcuate arms include an upper and a lower end; and
    said legs are connected at a position intermediate said upper and lower ends.

5. The clamp of claim 1 wherein said closure arrangement includes
   one or more teeth on the outer arcuate surface of a first of said arcuate arms near said upper end; and
   a plurality of notches on the inner arcuate surface of a second of said arcuate arms proximate said upper end.

6. The clamp of claim 2 wherein each of said post-receiving notches are adjacent and in close proximity to one of said posts.

7. A clamp comprising:
   an elongated base portion having two ends, a top side and a bottom side;
   a flexible leg extending from each of said ends;
   an arcuate arm connected to each of said legs, said arcuate arms including inner and outer arcuate surfaces, said inner arcuate surfaces of said arcuate arms facing one another;
   a closure arrangement on said arcuate arms;
   a locking arrangement on said arcuate arms;
   arm supports extending upward from said top side of said base portion;
   a post extending outwardly from said arcuate arms and toward said arm supports;
   an anchoring arrangement on said base portion, said anchoring arrangement includes one or more apertures in said base portion, said apertures extending from said top side to said bottom side; and
   a fastener extending through one or more of said apertures in said base portion; and locking tabs having apertures therein on said arcuate arms; and a fastener through said apertures in said locking tabs for securing said arcuate arms together.

8. The clamp of claim 1 wherein said inner arcuate surfaces of said arcuate arms define a substantially circular pipe-receiving opening.

9. The clamp of claim 8 wherein mounting of said bottom side of said base portion on a horizontal surface and insertion of a pipe within said pipe-receiving opening urges said posts toward said post-receiving notches.

10. A clamp comprising:
    an elongated base portion having two ends, a top side and a bottom side;
    a flexible leg extending from each of said ends;
    an arcuate arm connected to each of said legs, said arcuate arms including inner and outer arcuate surfaces, said inner arcuate surfaces of said arcuate arms facing one another;
    a closure arrangement on said arcuate arms;
    a locking arrangement on said arcuate arms;
    arm supports extending upward from said top side of said base portion;
    a post extending outwardly from said arcuate arms and toward said arm supports;
    an anchoring arrangement on said base portion;
    a post-receiving notch in said arm support;
    said inner arcuate surfaces of said arcuate arms defining a substantially circular pipe-receiving opening locking tabs having apertures therein on said arcuate arms; and
    a fastener through said apertures in said locking tabs for securing said arcuate arms together;
    mounting of said bottom side of said base portion on a vertical surface orients one of said posts upward and one of said posts downward; and
    insertion of a pipe within said pipe-receiving opening urges said downward oriented post downward and into engagement with said post-receiving notch.

11. The clamp of claim 10 wherein
    said flexible leg includes an inner surface;
    said arm support includes an outer surface;
    said inner surface of said flexible leg is in close proximity to said outer surface of said arm support; and
    mounting of said bottom side of said base portion on a vertical surface and insertion of a pipe within said pipe-receiving opening urges said inner surface of said flexible leg against said outer surface of said arm support.

12. The clamp of claim 1 including peripheral ribs extending from said outer arcuate surface of said arcuate arms; and
    said peripheral ribs extending around the outer periphery of said arcuate arms from said connection with said flexible legs to said closure arrangement.

* * * * *